United States Patent
Farre Guiu et al.

(10) Patent No.: US 10,856,041 B2
(45) Date of Patent: Dec. 1, 2020

(54) CONTENT PROMOTION USING A CONVERSATIONAL AGENT

(71) Applicant: Disney Enterprises, Inc., Burbank, CA (US)

(72) Inventors: Miquel Angel Farre Guiu, Bern (CH); Albert Aparicio Isarn, Barcelona (ES); Jordi Badia Pujol, Madrid (ES); Marc Junyent Martin, Barcelona (ES); Anthony M. Accardo, Los Angeles, CA (US); Jason Roeckle, Burbank, CA (US); John Solaro, Burbank, CA (US); Avner Swerdlow, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/357,185

(22) Filed: Mar. 18, 2019

(65) Prior Publication Data

US 2020/0304866 A1 Sep. 24, 2020

(51) Int. Cl.
| | | |
|---|---|---|
| *H04H 60/32* | (2008.01) | |
| *H04N 21/442* | (2011.01) | |
| *H04N 21/466* | (2011.01) | |
| *H04N 21/45* | (2011.01) | |

(52) U.S. Cl.
CPC ... *H04N 21/44204* (2013.01); *H04N 21/4532* (2013.01); *H04N 21/4668* (2013.01)

(58) Field of Classification Search
CPC ......... H04N 21/44204; H04N 21/4532; H04N 21/4668

USPC .......................................................... 725/14
See application file for complete search history.

(56) References Cited

U.S. PATENT DOCUMENTS

| | | | | |
|---|---|---|---|---|
| 6,065,042 A * | 5/2000 | Reimer | ................ | G11B 27/034 709/203 |
| 6,324,512 B1 * | 11/2001 | Junqua | ............... | H04N 5/44543 348/E5.105 |
| 6,330,537 B1 * | 12/2001 | Davis | ................. | H04N 5/44543 348/E5.105 |
| 6,415,257 B1 * | 7/2002 | Junqua | ............... | H04N 5/44543 348/E5.105 |
| 6,513,006 B2 * | 1/2003 | Howard | .............. | G10L 15/1822 348/E5.105 |

(Continued)

*Primary Examiner* — Michael B Pierorazio
(74) *Attorney, Agent, or Firm* — Farjami & Farjami LLP

(57) ABSTRACT

A content promotion system includes a computing platform having a hardware processor and a system memory storing a conversational agent software code. The hardware processor executes the conversational agent software code to receive user identification data, obtain user profile data including a content consumption history of a user associated with the user identification data, and identify a first predetermined phrase for use in interacting with the user based on the user profile data. In addition, the conversational agent software code initiates a dialog with the user based on the first predetermined phrase, detects a response or non-response to the dialog, updates the user profile data based on the response or non-response, resulting in updated user profile data, identifies a second predetermined phrase for use in interacting with the user based on the updated user profile data, and continues the dialog with the user based on the second predetermined phrase.

20 Claims, 7 Drawing Sheets

(56) References Cited

U.S. PATENT DOCUMENTS

| | | | | |
|---|---|---|---|---|
| 6,658,662 B1* | 12/2003 | Nielsen | | H04N 7/16 |
| | | | | 348/E7.054 |
| 7,092,888 B1* | 8/2006 | McCarthy | | G10L 15/063 |
| | | | | 379/88.01 |
| 7,664,678 B1* | 2/2010 | Haber | | G06Q 30/02 |
| | | | | 705/26.9 |
| 7,774,815 B1* | 8/2010 | Allen | | H04N 5/44513 |
| | | | | 725/51 |
| 7,814,524 B2 | 10/2010 | Candelore | | H04N 5/44543 |
| | | | | 715/716 |
| 8,079,054 B1* | 12/2011 | Dhawan | | G06Q 30/00 |
| | | | | 725/105 |
| 8,296,808 B2 | 10/2012 | Hardacker | | H04N 7/163 |
| | | | | 725/131 |
| 8,423,363 B2 | 4/2013 | Gupta | | G10L 15/22 |
| | | | | 704/231 |
| 8,572,488 B2 | 10/2013 | Phillips | | G06F 3/0482 |
| | | | | 715/716 |
| 9,462,340 B1* | 10/2016 | Mathurin | | H04N 21/234336 |
| 2002/0133562 A1* | 9/2002 | Newnam | | G06Q 30/02 |
| | | | | 709/216 |
| 2002/0162117 A1* | 10/2002 | Pearson | | H04N 5/445 |
| | | | | 725/109 |
| 2002/0170068 A1* | 11/2002 | Rafey | | H04N 5/4401 |
| | | | | 725/112 |
| 2003/0025832 A1* | 2/2003 | Swart | | H04N 7/17318 |
| | | | | 348/461 |
| 2003/0206717 A1* | 11/2003 | Yogeshwar | | H04N 5/76 |
| | | | | 386/328 |
| 2004/0073493 A1* | 4/2004 | Kato | | G06Q 30/02 |
| | | | | 705/500 |
| 2004/0096110 A1* | 5/2004 | Yogeshwar | | G06F 16/68 |
| | | | | 382/239 |
| 2005/0066352 A1* | 3/2005 | Herley | | H04N 7/16 |
| | | | | 725/19 |
| 2005/0188411 A1* | 8/2005 | Dacosta | | H04N 5/44543 |
| | | | | 725/110 |
| 2006/0015339 A1* | 1/2006 | Charlesworth | | G06F 16/685 |
| | | | | 704/251 |
| 2007/0061862 A1* | 3/2007 | Berger | | H04N 7/163 |
| | | | | 725/139 |
| 2007/0112837 A1* | 5/2007 | Houh | | G06F 16/41 |
| 2007/0124756 A1* | 5/2007 | Covell | | G06F 16/683 |
| | | | | 725/18 |
| 2007/0124788 A1* | 5/2007 | Wittkoter | | H04N 21/4113 |
| | | | | 725/112 |
| 2008/0091713 A1* | 4/2008 | Candelore | | H04N 7/163 |
| 2008/0097984 A1* | 4/2008 | Candelore | | G06K 9/325 |
| 2008/0204595 A1* | 8/2008 | Rathod | | H04N 21/4348 |
| | | | | 348/465 |
| 2008/0266449 A1* | 10/2008 | Rathod | | H04N 7/0884 |
| | | | | 348/468 |
| 2008/0285940 A1* | 11/2008 | Kulas | | G11B 27/3027 |
| | | | | 386/248 |
| 2009/0094632 A1* | 4/2009 | Newnam | | H04N 7/17318 |
| | | | | 725/24 |
| 2009/0112592 A1* | 4/2009 | Candelore | | H04N 5/4403 |
| | | | | 704/246 |
| 2009/0293081 A1* | 11/2009 | Pirani | | H04N 7/17318 |
| | | | | 725/25 |
| 2009/0299752 A1* | 12/2009 | Rodriguez | | D06F 58/30 |
| | | | | 704/275 |
| 2010/0316131 A1* | 12/2010 | Shanableh | | G06T 7/0002 |
| | | | | 375/240.24 |
| 2011/0069940 A1* | 3/2011 | Shimy | | G11B 27/105 |
| | | | | 386/296 |
| 2011/0145883 A1* | 6/2011 | Godar | | H04N 5/445 |
| | | | | 725/131 |
| 2011/0283189 A1* | 11/2011 | McCarty | | H04N 5/44543 |
| | | | | 715/707 |
| 2011/0289530 A1* | 11/2011 | Dureau | | H04N 21/4622 |
| | | | | 725/38 |
| 2012/0016678 A1* | 1/2012 | Gruber | | G06F 9/54 |
| | | | | 704/275 |
| 2012/0210349 A1* | 8/2012 | Campana | | G06F 3/147 |
| | | | | 725/32 |
| 2014/0181865 A1* | 6/2014 | Koganei | | H04N 21/42203 |
| | | | | 725/38 |
| 2014/0278834 A1* | 9/2014 | Lautz | | G06Q 30/0203 |
| | | | | 705/12 |
| 2014/0350925 A1* | 11/2014 | Park | | G10L 15/22 |
| | | | | 704/231 |
| 2014/0373082 A1* | 12/2014 | Miyazaki | | H04N 21/4126 |
| | | | | 725/110 |
| 2015/0082349 A1* | 3/2015 | Ishtiaq | | H04N 21/23418 |
| | | | | 725/40 |
| 2015/0229975 A1* | 8/2015 | Shaw | | G06F 16/24 |
| | | | | 725/10 |

\* cited by examiner

CONTENT PROMOTION USING A CONVERSATIONAL AGENT

BACKGROUND

Movie and television (TV) programming content are consistently sought out and enjoyed by consumers. Nevertheless, the popularity of a particular item or items of such content, for example, a particular movie, TV series, or even a specific TV episode can vary widely. In some instances, that variance in popularity may be due to fundamental differences in personal taste among consumers. However, in other instances, the lack of consumer interaction with content may be due primarily to lack of familiarity with the content or reluctance to try something different. Due to the resources often devoted to developing new content, the efficiency and effectiveness with which content likely to be desirable to consumers can be promoted to those consumers has become increasingly important to producers, owners, and distributors of media content.

SUMMARY

There are provided systems and methods for promoting content using a conversational agent, substantially as shown in and/or described in connection with at least one of the figures, and as set forth more completely in the claims.

DETAILED DESCRIPTION

Figure 1:
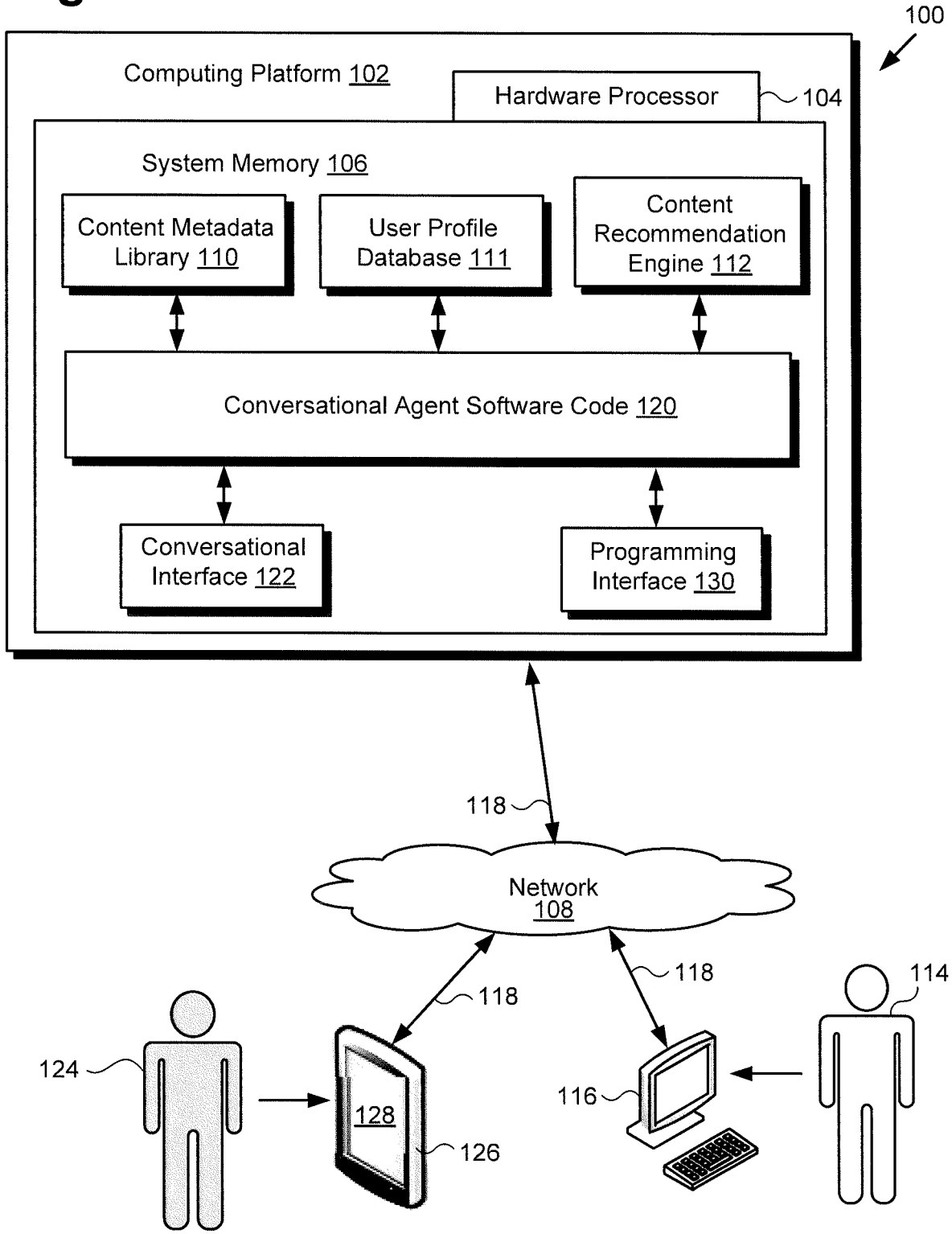
FIG. 1 shows an exemplary content promotion system providing a conversational user interface, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses automated systems and methods for promoting content using a conversational agent that address and overcome the deficiencies in the conventional art. It is noted that, as used in the present application, the terms "automation," "automated", and "automating" refer to systems and processes that do not require the participation of a human editor. Although, the dialog classifications and the predetermined phrases and phrase templates used by the conversational agent disclosed herein are programmed into the conversational agent software code by a human editor, the selection and use of those resources to initiate and continue a dialog is performed in an automated process. Thus, the methods described in the present application may be performed under the control of hardware processing components of the disclosed systems. It is further noted that, as used in the present application, the features "conversational agent" and "conversational agent software code" are equivalent and may be used interchangeably.

FIG. 1 shows an exemplary system for promoting content using a conversational agent, according to one implementation. As shown in FIG. 1, system 100 includes computing platform 102 having hardware processor 104 and system memory 106 implemented as a non-transitory storage device. According to the present exemplary implementation, system memory 106 stores content metadata library 110, user profile database 111, content recommendation engine 112, and conversational agent software code 120. Also shown in FIG. 1 are conversational interface 122 and programming interface 130 provided by conversational agent software code 120.

As further shown in FIG. 1, system 100 is implemented within a use environment including communication network 108, programming device 116, programmer or editor 114 (hereinafter "editor 114") utilizing programming device 116, personal communication device 126 including display 128, and user 124 of personal communication device 126. In addition, FIG. 1 shows network communication links 118 of communication network 108 interactively connecting programming device 116 and personal communication device 126 with system 100.

It is noted that, although the present application refers to conversational agent software code 120 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is further noted that although FIG. 1 depicts conversational agent software code 120, content metadata library 110, user profile database 111, and content recommendation engine 112 as being co-located in system memory 106, that representation is merely provided as an aid to conceptual clarity. More generally, system 100 may include one or more computing platforms 102, such as computer servers for example, which may be co-located, or may form an interactively linked but distributed system, such as a cloud based system, for instance. As a result, hardware processor 104 and system memory 106 may correspond to distributed processor and memory resources within system 100. That is to say, in some implementations, conversational agent software code 120, content metadata library 110, user profile database 111, and content recommendation engine 112 may be stored remotely from one another on the distributed memory resources of system 100.

According to the implementation shown by FIG. 1, editor 114 may utilize programming device 116 to interact with system 100 over communication network 108. For example, editor 116 may interact with system 100 to update, delete, or otherwise modify content metadata stored in content metadata library 110, or to update user profile database 111. As another example, editor 114 may interact with system 100 to generate predetermined phrases or phrase templates for use by conversational software code 120.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution network.

Although programming device 116 is shown as a mobile computing device such as a desktop computer in FIG. 1, that representation is provided merely as an example. More generally, programming device 116 may be any suitable mobile or stationary computing system that implements data processing capabilities sufficient to support connections to communication network 108, provide programming interface 130, and implement the functionality ascribed to programming device 116 herein. For example, in other implementations, programming device 116 may take the form of a laptop computer, tablet computer, or smartphone, for example.

User 124 may utilize personal communication device 126 to interact with system 100 over communication network 108. For example, user 124 may engage in a dialog with conversational agent software code 120. Although personal communication device 126 is shown as a mobile computing device such as a smartphone or tablet computer in FIG. 1, that representation is also provided merely as an example. More generally, personal communication device 126 may be any suitable mobile or stationary personal communication device or system that implements data processing capabilities sufficient to support connections to communication network 108, provide conversational interface 122, and implement the functionality ascribed to personal communication device 126 herein. For example, in other implementations, personal communication device 126 may take the form of a desktop computer, a laptop computer, a smart television (smart TV), a digital media player, or a gaming console, for example.

User 124, who may be a consumer of media content such as movies, TV programming content, or video games, for example, may utilize personal communication device 126 to interact with system 100 via conversational interface s 122. For example, user 124 may seek content recommendations obtainable from content recommendation engine 112 by conversational agent software code 120. Alternatively, or in in addition, conversational agent software code 120 may initiate a dialog with user 124 via conversational interface 122 to promote content by prompting user 124 to resume consumption of content that has been stopped, paused, or otherwise temporarily abandoned. In some implementations, conversational agent software code 120 may initiate a dialog with user 124 via conversational interface 122 to promote content by making user 124 aware of new or unfamiliar content likely to be desirable to user 124.

Conversational interface 122 may be presented to user 124 on display 128 of personal communication device 126. Display 128 may take the form of a liquid crystal display (LCD), a light-emitting diode (LED) display, an organic light-emitting diode (OLED) display, or another suitable display screen that performs a physical transformation of signals to light.

Figure 2:
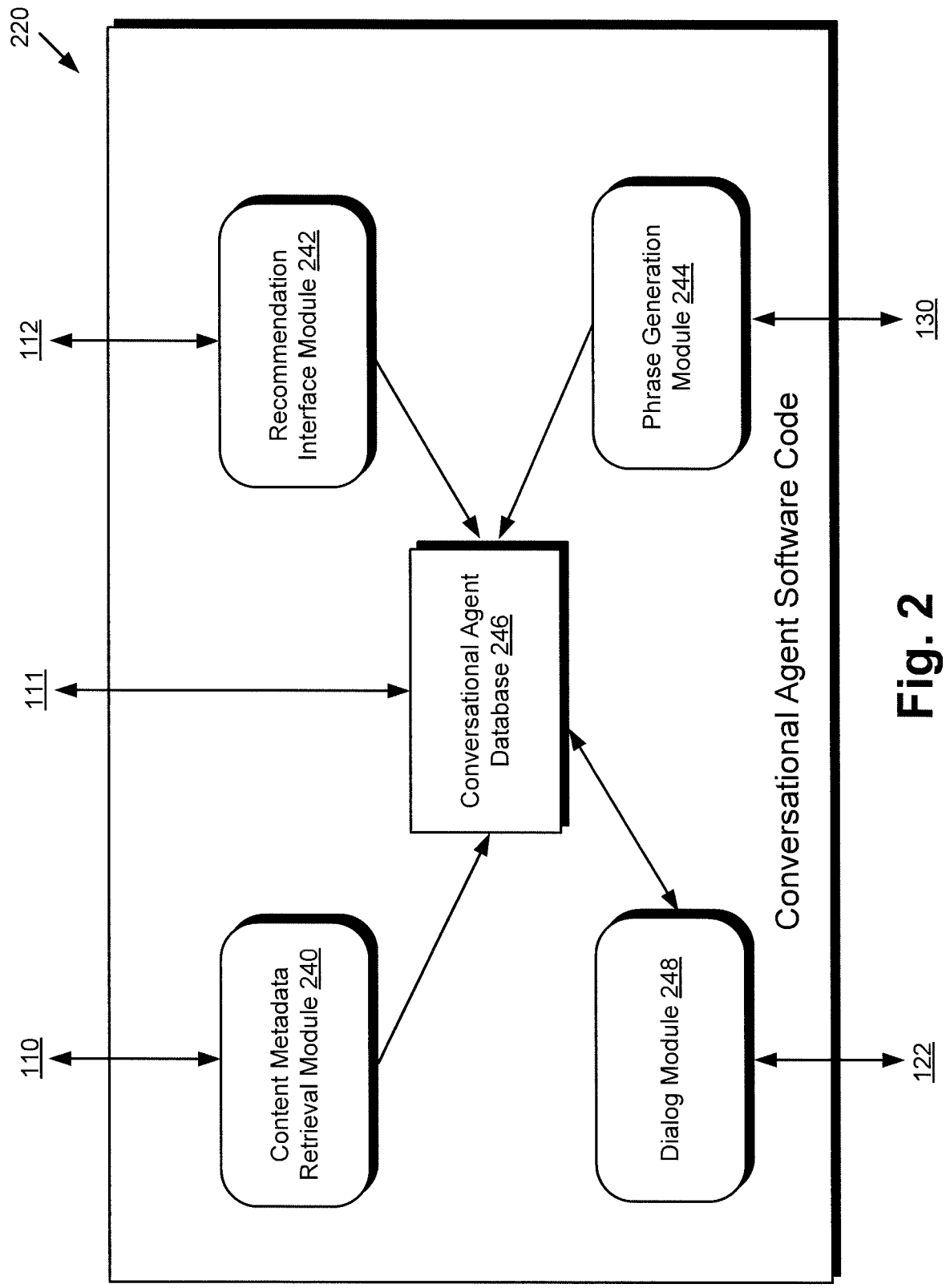
FIG. 2 shows an exemplary conversational agent software code suitable for execution by a hardware processor of the system of FIG. 1, according to one implementation.

FIG. 2 shows exemplary conversational agent software code 220 suitable for execution by hardware processor 104 of system 100, in FIG. 1, according to one implementation. As shown in FIG. 2, conversational agent software code 220 may include content metadata retrieval module 240, recommendation interface module 242, phrase generation module 244, conversational agent database 246, and dialog module 248. As shown in FIG. 2, content metadata retrieval module 240 is configured to be communicatively coupled to content metadata library 110, in FIG. 1, while recommendation interface module 242 is configured to be communicatively coupled to content recommendation engine 112.

As further shown in FIG. 2, phrase generation module 244 of conversational agent software code 220 is interactively linked to programming interface 130, in FIG. 1, and dialog module 248 is interactively linked to conversational interface 122, as well as to conversational agent database 246. In addition to being interactively linked to dialog module 248, conversational agent database 246 is communicatively coupled to user profile database 111, in FIG. 1, and at least receives data and/or metadata from content metadata retrieval module 240, recommendation interface module 242, and phrase generation module 244.

Conversational agent software code 220, in FIG. 2, corresponds in general to conversational agent software code 120, in FIG. 1, and those corresponding features may share any of the characteristics attributed to either corresponding feature by the present disclosure. That is to say, like conversational agent software code 220, conversational agent software code 120 may include features corresponding respectively to content metadata retrieval module 240, recommendation interface module 242, phrase generation module 244, conversational agent database 246, and dialog module 248.

Figure 3A:
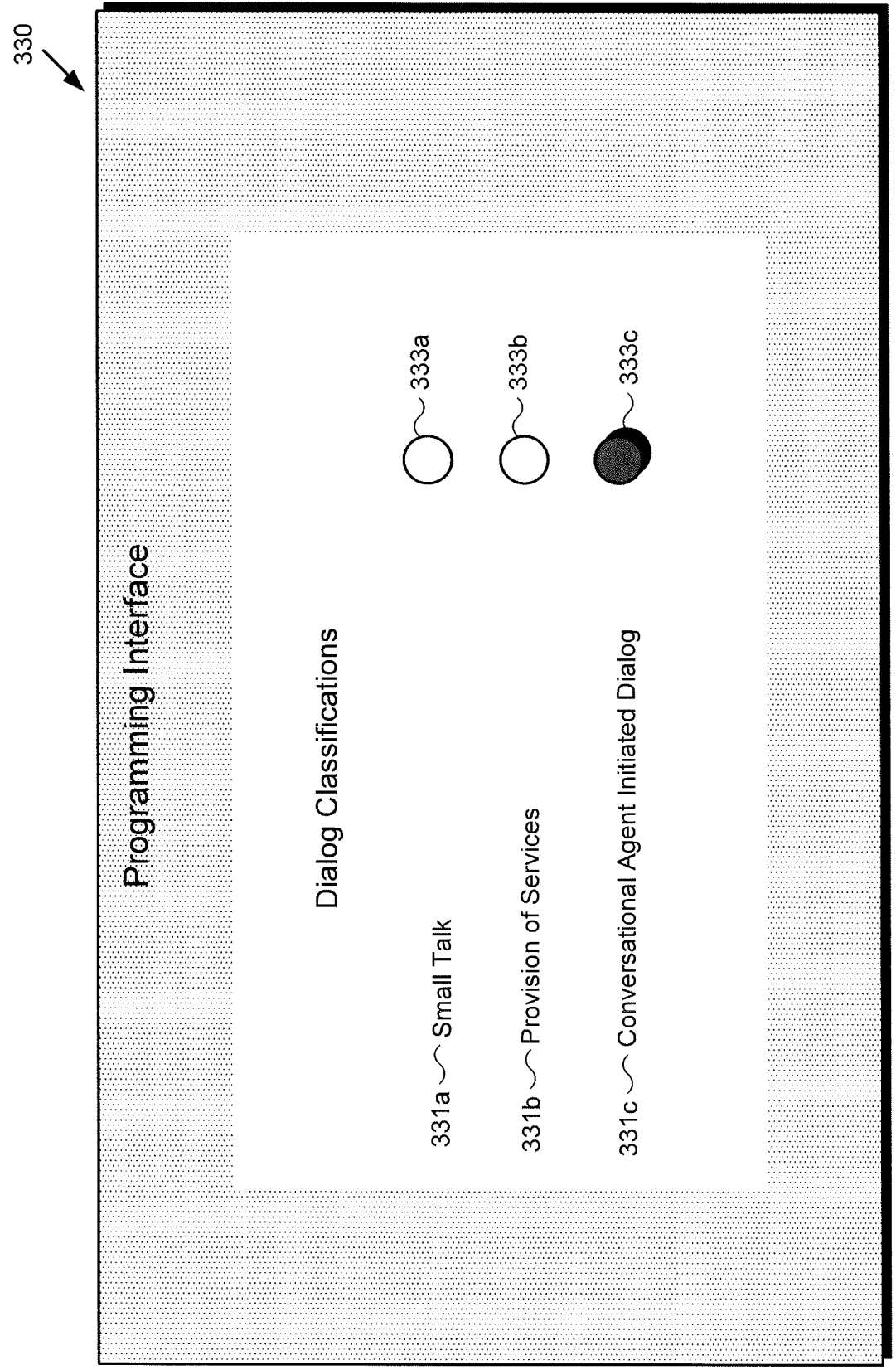
FIG. 3A shows an exemplary programming interface of the system of FIG. 1, displaying a list of selectable dialog classifications, according to one implementation.

FIG. 3A shows exemplary programming interface 330 provided by conversational agent software code 120/220, according to one implementation. As shown in FIG. 3A exemplary programming interface 330 is displaying dialog classifications 331a, 331b, and 331c (hereinafter "dialog classifications 331a-331c"). Also shown in FIG. 3A are selection buttons 333a, 333b, and 333c enabling selection of one of respective dialog classifications 331a-331c. Programming interface 330 corresponds in general to programming interface 130, in FIG. 1, and those corresponding features may share any of the characteristics attributed to either corresponding feature by the present disclosure.

By way of example, editor 114 may use programming device 116 and programming interface 130/330 to interact with, i.e., program, conversational agent software code 120/220. As shown in FIGS. 2 and 3A, editor 114 may define the classification of a dialog to be populated using predetermined phrases or phrase templates generated using phrase generation module 244 by selecting one of small talk dialog classification 331a, provision of services dialog classification 331b, and conversational agent initiated dialog classification 331c.

Small talk 331a may define a dialog class including brief phrases or comments relevant to content about which user 124 has expressed interest. Provision of services 331b may define a dialog class of phrases designed to assist user 124, and generally responsive to requests and inquiries initiated by user 124. Conversational agent initiated dialog 331c may define a dialog class of phrases for use by conversational agent software code 120/220 to reach out to user 124. It is noted that there may be some overlap in the predetermined phrases generated for and associated with dialog classifications 331a-331c. For example, a content recommendation phrase by conversational agent software code 120/220 may be included as a predetermined phrase associated with provision of services dialog classification 331b as well as with conversational agent initiated dialog classification 331c. As shown in FIG. 3A, according to the present example, editor 114 has selected conversational agent initiated dialog classification 331c.

As shown in FIG. 3A, programming interface 130/330 can be used to define or classify the nature of a dialog with a user, such as user 124. In addition, in some implementations, programming interface 130/330 can be used to define the type of input expected from user 124. For example, for some dialogs, editor 114 may specify that input from user 124 be via keyboard or voice, while in others, buttons or selectable menus may be displayed to user 124 via conversational interface 122. In some implementations, programming interface 130/330 can be used to send surprise messages to user 124 via conversational interface 122. For example, a conversational agent initiated dialog 331c may include a Happy Birthday greeting if it is the birthday of user 124. If user 124 responds to the surprise birthday greeting, fireworks or other celebratory images may be rendered on display 128 of personal communication device 126.

Figure 3B:
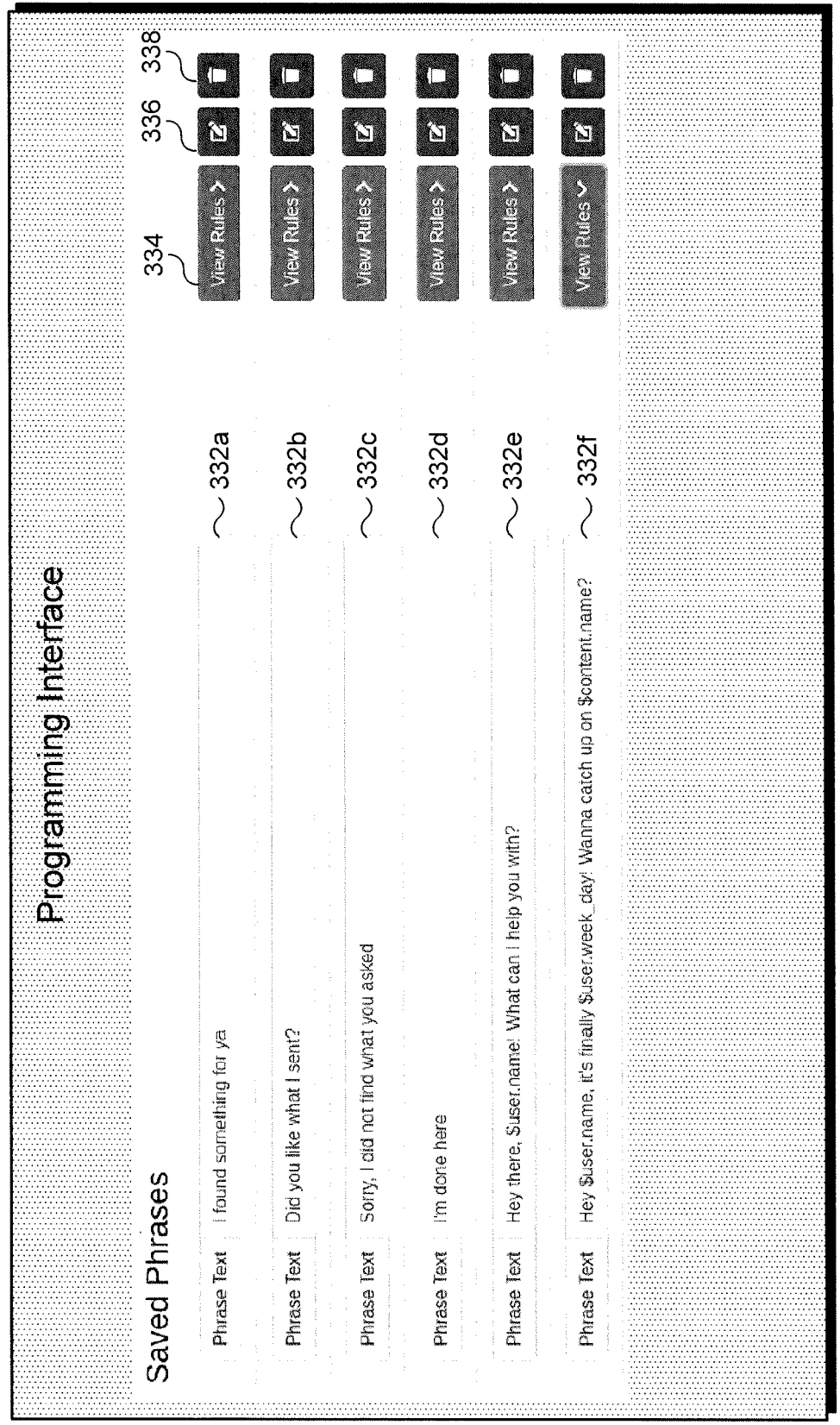
FIG. 3B shows the exemplary programming interface of FIG. 3A, displaying a list of predetermined phrases for use by a conversational agent, according to one implementation.

FIG. 3B shows exemplary programming interface 130/330 displaying a list of predetermined phrases associated with one of dialog classifications 331a-331c in FIG. 3A, according to one implementation. For example, predetermined phrases 332a, 332b, 332c, 332d, 332e, and 332f (hereinafter "predetermined phrases 332a-332f") shown in FIG. 3B may be predetermined phrases available for use in a dialog with user 124 classified as conversational agent initiated dialog 331c. Also shown in FIG. 3B are rules 334 associated respectively with each of predetermined phrases 332a-332f, editing buttons 336 for each of predetermined phrases 332a-332f, and trash buttons 338 enabling selective deletion of any of predetermined phrases 332a-332f.

By way of example, editor 114 may use programming interface 130/330 to interact with, i.e., program, conversational agent software code 120/220. As shown in FIGS. 2 and 3B, editor 114 may generate predetermined phrases 332a-332b based on inputs provided by editor 114 to programming interface 130/330 and using phrase generation module 244. Once generated, predetermined phrases 332a-332b may be stored in conversational agent database 246 for use by dialog module 248 to initiate or continue a dialog classified as a conversational agent initiated dialog with user 124. In addition, and as further shown by FIGS. 2 and 3B, once predetermined phrases 332a-332f are generated, editor 114 may interact with phrase generation module 244 of conversational agent software code 120/220 via programming interface 130/330 to edit one or more of predetermined phrases 332a-332f using edit buttons 336, or to delete one or more predetermined phrases 332a-332f using trash buttons 338.

It is noted that, as defined in the present application, the feature "predetermined phrase" may refer to a phrase that has been completely predetermined, or to a phrase template that is partially predetermined but includes wildcards to be populated based on user specific data and/or content metadata. Referring to FIG. 3B, predetermined phrases 332a, 332b, 332c, and 332d are examples of predetermined phrases that are completely predetermined because every word in those phrases is set, and may only be modified by manual editing by editor 114. By contrast predetermined phrases 332e and 332f are each phrase templates including at least one wildcard, as described below.

Figure 3C:
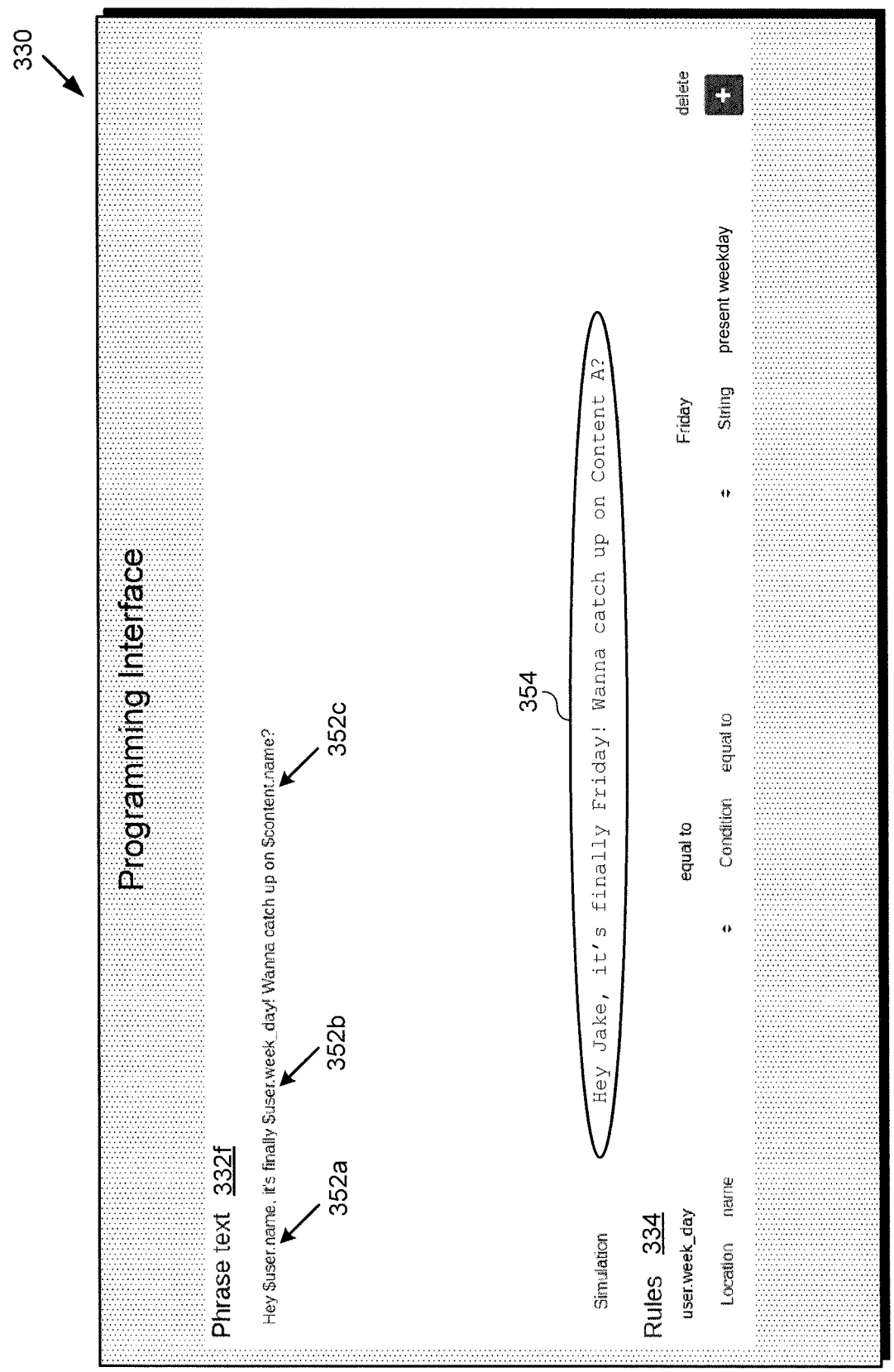
FIG. 3C shows the exemplary programming interface of FIG. 3A, displaying a phrase generation window enabling the generation of phrases for use by a conversational agent, according to one implementation.

FIG. 3C shows exemplary programming interface 130/330 displaying a phrase generation window enabling the generation of predetermined phrases 332a-332f, in FIG. 3B, according to one implementation. Specifically, FIG. 3C shows predetermined phrase 332f including wildcards 352a, 352b, and 352c, as well as rules 334 for populating those wildcards when predetermined phrase 332f is used as part of a dialog with user 124. Again by way of example, rules 334 specify that wildcard 352b, i.e., "$user.week_day", be populated by the actual present weekday when the dialog takes place. Thus, as defined in the present application, a wildcard is a placeholder expression included in a phrase template that is associated with rules 334 specifying what user specific data and/or metadata will be substituted for the wildcard in a dialog phrase based on the phrase template.

It is noted that if the conditions imposed by rules 334 are not met in a particular case because the user profile data or content metadata are inconsistent with the predetermined phrase corresponding to rules 334, that predetermined phrase will not be used. As a specific example of the foregoing, if a predetermined phrase is the greeting "happy birthday from the cast of Content A", that predetermined phrase will not be used if user 124 does not consume Content A, or if today is not the birthday of user 124.

Dialog phrase 354 is an example of a dialog phrase generated based on predetermined phrase 332f for the particular use case in which user 124 is named Jake, Jake has previously watched or otherwise consumed Content A now being promoted by system 100, and Jake is interacting with dialog module 248 of conversational agent software code 120/220 on a Friday. Thus, wildcard 352a is selectively populated as Jake, wildcard 352b is selectively populated as Friday, and wildcard 352c is selectively populated as Content A. Dialog phrase 354 may be rendered as text on display 128 of personal communication device 126 during a dialog with user 124, or may be converted from text to speech and be provided as a spoken word audio output to user 124, for example.

Figure 3D:
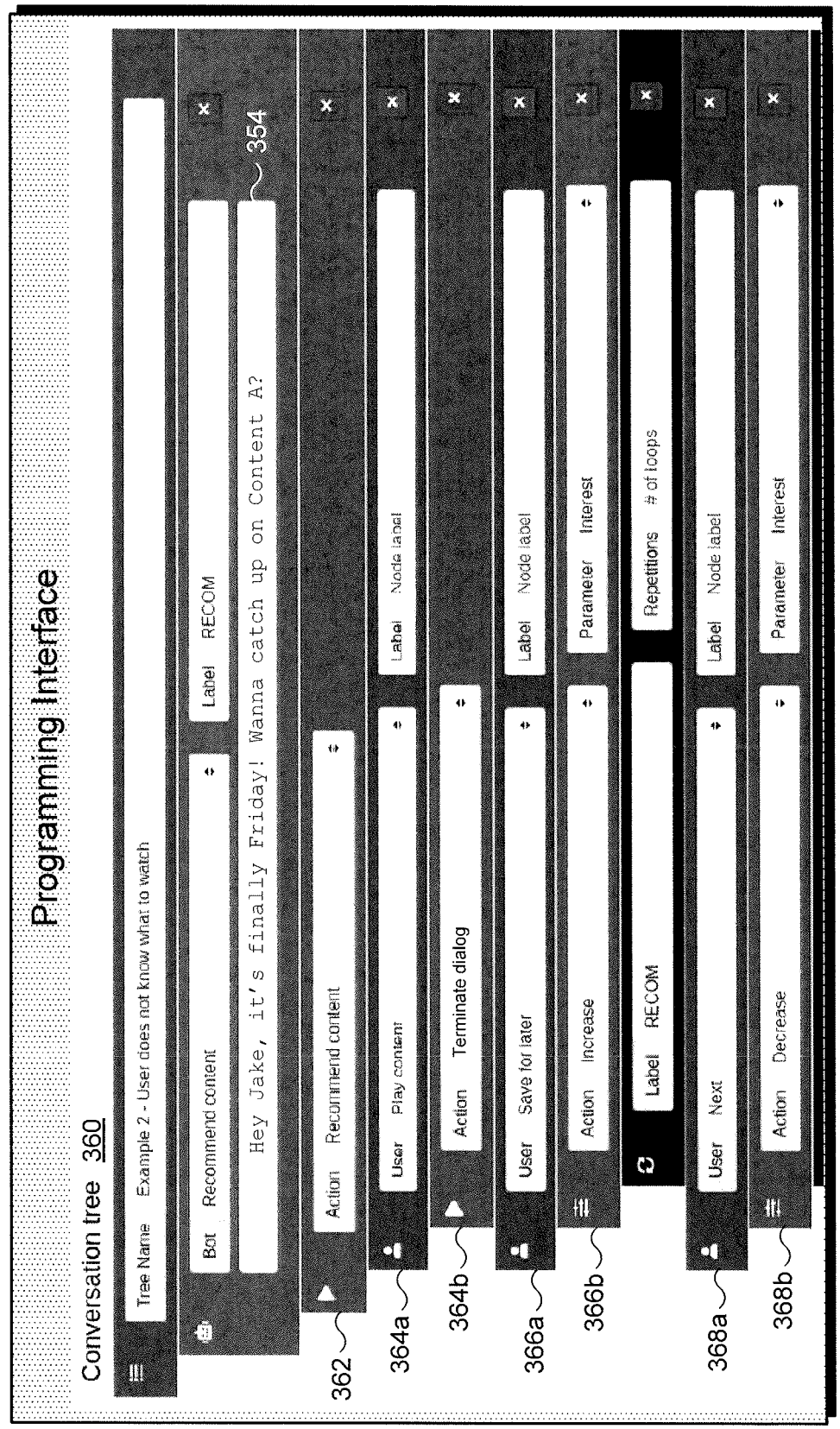
FIG. 3D shows the exemplary programming interface of FIG. 3A, displaying a conversation tree for use by a conversational agent, according to one implementation.

FIG. 3D shows exemplary programming interface 130/330 displaying conversation tree 360 for use by dialog module 248 of conversational agent software code 120/220, according to one implementation. As shown by FIG. 3D, conversational agent software code 120/220 may take action 362 to recommend or promote content, i.e., Content A to user Jake 124 on a Friday based on predetermined phrase 332f, in FIGS. 3B and 3C, resulting in initiation of a dialog with user 124 using dialog phrase 354.

As shown in FIG. 3D, conversation tree 360 may include various contingencies depending on the response by user 124 to dialog phrase 354. For example, if user 124 wishes to play Content A, as indicated by user action 364a, conversation tree 360 may specify that the dialog be terminated by conversational agent software code 120/220 so as not to interfere with consumption of Content A by user 124.

In use cases in which user 124 responds to dialog phrase 354 with user action 366a expressing interest in Content A but requesting that it be saved for later, conversational agent software code 120/220 may increase the interest level associating user 124 with Content A, as action 366b. In addition, conversational agent software code 120/220 may update user profile data for user 124 on conversational agent database 246 and/or user profile database 111 to include that increased interest level.

By contrast, if user 124 responds to dialog phrase 354 with user action 368a expressing a lack of interest in Content A, conversational agent software code 120/220 may decrease the interest level associating user 124 with Content A, as action 368b. Moreover, conversational agent software code 120/220 may update user profile data for user 124 on conversational agent database 246 and/or user profile database 111 to include that decreased interest level.

Figure 4:
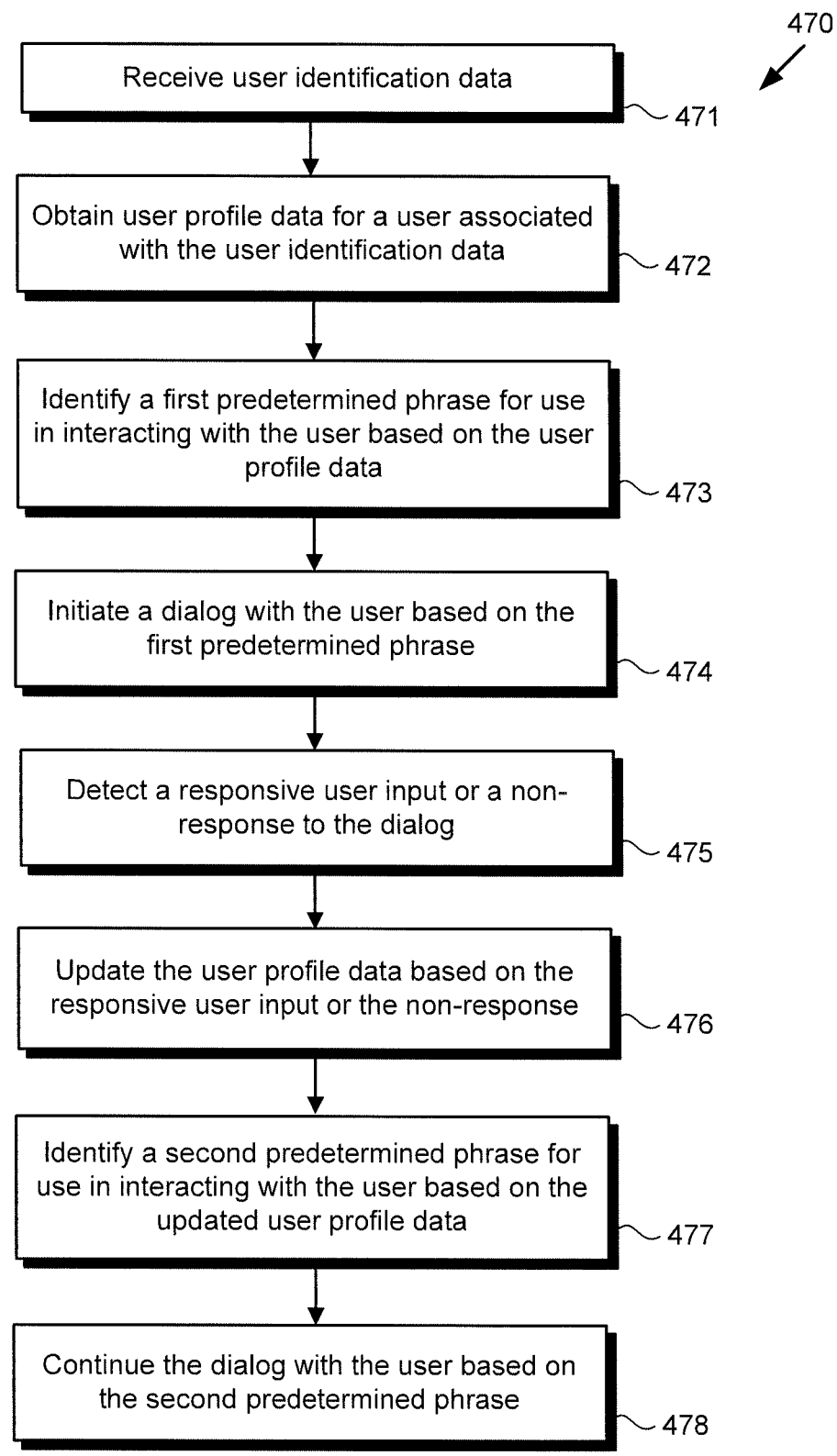
FIG. 4 shows a flowchart presenting an exemplary method for use by a conversational agent to carry on a dialog with a user, according to one implementation.

The functionality of conversational agent software code 120/220 will be further described by reference to FIG. 4. FIG. 4 shows flowchart 470 presenting an exemplary method for use by a system, such as system 100, for promoting content using a conversational agent, according to one implementation. With respect to the method outlined in FIG. 4, it is noted that certain details and features have been left out of flowchart 470 in order not to obscure the discussion of the inventive features in the present application.

Referring to FIG. 4, with further reference to FIGS. 1 and 2, flowchart 470 begins with receiving user identification data (action 471). For example, in one implementation, the user identification data may be received during a session initiation process in which user 124 selects an application icon corresponding to conversational agent software code 120/220. Such an application icon may be resident on personal communication device 126, or may be accessible via communication network 108 and network communication links 118, and its selection may begin execution of conversational agent software code 120/220. The user identification data may be received by conversational agent software code 120/220, executed by hardware processor 104 of computing platform 102.

Flowchart 470 continues with obtaining a user profile data for user 124 associated with the user identification data received in action 471, the user profile data including a content consumption history of user 124 (action 472). The user profile data including the content consumption history of user 124 may be stored in user profile database 111, for example. The user profile data may be obtained from user profile database 111 by conversational agent software code 120/220, executed by hardware processor 104, and may be held in conversational agent database 246 during a dialog or interaction session between user 124 and conversational agent software code 120/220.

As noted above, the content consumed by user 124 and described by the content consumption history data included in the user profile data for user 124 may include movies, TV programming content, or video games. Moreover, the level of granularity at which the content consumption history data is annotated or tagged may vary. For example, and using TV programming content as an example, in some implementations, the content consumption history of user 124 may describe content viewed by user 124 at the TV series level, while in other implementations, content consumption may be described at the level of individual episodes of a TV series.

In yet other implementations, the level of granularity with which content consumption is tracked for user 124 in the content consumption history of user 124 may be described at the level of scenes within episodes, shots within scenes, or even individual frames of video included in such shots.

With respect to the expressions "shot" or "shots" of video, it is noted that, as used in the present application, the term "shot" refers to a sequence of frames within a video file that are captured from a unique camera perspective without cuts and/or other cinematic transitions. It is further noted that content in the form of movies or video games may be annotated or tagged at levels of granularity analogous to those described above for TV programming content.

In addition to the user content consumption history of user 124, the user profile data obtained in action 472 may include additional descriptive data associated with user 124 and/or the present interaction session. Examples of such user profile data may include, what specific item of content user 124 is presently expressing interest in viewing or learning about, as well as the present date, day of the week, and time of day. In addition, the user profile data may include the name of user 124, the user's birthday, and previously analyzed content preferences and dislikes. For example, the user profile data for user 124 may include whether user 124 enjoys being introduced to entirely new and unfamiliar content, or whether that type of interaction is a source of frustration for user 124. Moreover, in some implementations, the user profile data may include whether user 124 generally prefers to initiate dialogs with conversational agent software code 120/220 or prefers conversational agent software code 120/220 to initiate the dialogs by "reaching out" to user 124.

It is noted that in use cases in which user 124 is in the midst of a dialog with conversational agent software code 120/220, or has previously engaged in dialog with conversational agent software code 120/220, user profile data for user 124 may also include a dialog history of user 124 with conversational agent software code 120/220. Such a dialog history may include, for example, identification of particular phrases to which user 124 responds positively, as well as phrases that cause frustration to user 124.

Flowchart 470 continues with identifying a first predetermined phrase for use in interacting with user 124 based on the user profile data obtained in action 472 (action 473). As noted above, examples of predetermined phrases are shown in FIG. 3B as predetermined phrases 332a-332f. However, it is emphasized that predetermined phrases 332a-332f are merely exemplary. More generally, deep metadata describing content promoted by system 100 may be used to generate predetermined phrases corresponding to predetermined phrases 332a-332f.

It is noted that, as defined in the present application, the expression "deep metadata" refers to metadata that includes standard metadata descriptions of content, by file name, title, genre, production date, resolution and so forth, as well as providing descriptions of the content at a more technically detailed, nuanced, or conceptual level than standard metadata. Examples of technically detailed deep metadata describing video, for instance, may include characterizations of scenes and/or shots of video in terms of the number of shots in a given scene, a dominant color appearing in a shot, the number of character depicted in a shot or scene, the lighting level in a shot or scene, and/or locations appearing in a shot or scene, to name a few. Examples of nuanced or conceptual deep metadata may include story archetypes (e.g., tragedy, redemption) represented in the content per storyline, character archetypes (e.g., heroic, villainous) represented in the story or per storyline, and character motivations (e.g., loyalty, cowardice, greed), to name a few. Such deep metadata may be accessed on content metadata library 110 by conversational agent software code 120/220, using content metadata retrieval module 240. Editor 114 may utilize such deep metadata when generating predetermined phrases such as predetermined phrases 332a-332f using programming interface 130 and phrase generation module 244.

Referring once again to the exemplary use case in which content takes the form of TV programming content, examples of deep metadata available from content metadata library 110 may include identification of the main characters in a series, episode, scene, or shot, the number of times each character appears in each scene, and relationships between characters. In addition, or alternatively, and as noted above, the deep metadata may include story archetype, e.g., tragic, redemptive, triumphant, character archetypes, e.g., hero/heroine, villain, and/or character motivations. Moreover, in some implementations, the deep metadata may include locations and/or actions or events depicted in a series, episode, scene, or shot.

In addition to use of deep metadata available on content metadata library 110 for use in generating predetermined phrases corresponding to predetermined phrases 332a-332f, that deep metadata may also be accessed and used in conjunction with the user profile data obtained in action 472 to identify a first predetermined phrase for use in interacting with user 124. Identification of the first predetermined phrase for use in interacting with user 124 may be performed in an automated process by conversational agent software code 120/220, executed by hardware processor 104, and using dialog module 248.

In some implementations, for example, the first predetermined phrase identified by conversational agent software code 120/220 may take the form of small talk regarding content that user 124 has expressed interest in. In other implementations, the first predetermined phrase identified by conversational agent software code 120/220 may be an affirmative recommendation of content to user 124 based on the content consumption history of user 124. For instance, where the user profile data for user 124 identifies "Content A" as consistently viewed or otherwise consumed by user 124 and a new episode of Content A is available, conversational agent software code 120/220 may inform user 124 of that availability and suggest that user 124 watch the new episode.

In some implementations, the first predetermined phrase identified by conversational agent software code 120/220 may take the form of a question. In use cases where user 124 no longer consumes new episodes of a TV series, for example, conversational agent software code 120/220 may ask user 124 if he/she is no longer interested in the TV series. Moreover, where user 124 had been a consistent consumer of a particular TV series but more recently consumes episodes sporadically, conversational agent software code 120/220 may ask user 124 if he/she has watched the apparently missed episodes via another content distribution service or using another platform.

Although not included in the outline provided by flowchart 470, in some implementations, action 472 may be followed by, and action 473 may be preceded by, determining a dialog classification for communication with user 124, and identifying multiple alternative predetermined phrases for use in interacting with user 124 based on that dialog classification. For example, hardware processor 104 may execute conversational agent software code 120/220 to determine to engage in conversational agent initiated dialog 331c with user 124. In that implementation, conversational agent software code 120/220 may then identify predetermined phrases 332a-332f as being available for use in interacting with user 124 based on the present dialog being classified as conversational agent initiated dialog 331c.

It is noted that determination of another of dialog classifications 331a or 331b for communicating with user 124 may result in a different list of predetermined phrases for use in interacting with user 124. However, as noted above, there may be some overlap in the predetermined phrases associated with each dialog classification. That is to say, one or more of predetermined phrases 332a-332f associated with conversational agent initiated dialog 331c may also be associated with one or both of small talk dialog classification 331a and provision of services dialog classification 331b.

Although also not included in the outline provided by flowchart 470, in some implementations the present method may further include a validation stage during which the validity of each of the multiple alternative predetermined phrases for use in interacting with user 124 is evaluated. For example, in this part of the process each possible predetermined phrase may be checked for validity by verifying that what is being said in the predetermined phrase is true. Validation of each predetermined phrase may be performed by checking the tags or annotations applied to the content for agreement with that predetermined phrase. For example, for a predetermined phrase remarking on how many locations a character has appeared in during the content, validation may include inspecting the content annotations to verify that the character actually appears in those locations based on timestamps, character tags, and location tags. Predetermined phrases that are determined to be valid remain available for use in interacting with user 124.

Flowchart 470 continues with initiating a dialog with user 124 based on the first predetermined phrase identified in action 473 (action 474). Initiation of the dialog with user 124 based on the first predetermined phrase identified in action 473 may be performed via conversational interface 122 by conversational agent software code 120/220, executed by hardware processor 104, and using dialog module 248. For example, referring to FIGS. 3B and 3C, action 474 may be performed by causing dialog phrase 354 corresponding to predetermined phrase 332f to be rendered as text on display 128 of personal communication device 126, or to be converted from text to speech and be provided as a spoken word audio output to user 124, for example.

As a specific example in which dialog phrase 354 is output to user 124 as speech, in some implementations, hardware processor 104 may execute conversational agent software code 120/220 to assume the persona of a TV, movie, or video game character based on the user profile data for user 124 obtained in action 472. In those implementations, an image of the character assumed by conversational agent software code 120/220 may be rendered on display 128 of personal communication device 126 and may appear to speak dialog phrase 354. It is noted that in implementations in which conversational agent software code 120/220 assumes the persona of a character, the first predetermined phrase may be identified in action 473 based on that persona, as well as based on the user profile data for user 124. As noted above, "predetermined phrase" may refer to a phrase that has been completely predetermined, or to a phrase template that is partially predetermined but includes wildcards to be populated based on user specific data. Predetermined phrases 332a, 332b, 332c, and 332d are examples of predetermined phrases that are completely predetermined because every word in those phrases is set. Thus, action 474 may be performed using any of predetermined phrases 332a, 332b, 332c, or 332d directly, without personalizing or otherwise modifying them.

By contrast, predetermined phrases 332e and 332f are each phrase templates including at least one wildcard. Thus, when initiating a dialog with user 124 using either of predetermined phrases 332e or 332f, hardware processor 104 is configured to execute conversational agent software code 120/220 to populate the one or more wildcards, such as wildcards 352a, 352b, and 352c in FIG. 3C. It is noted that wildcards such as wildcards 352a, 352b, and 352c may be populated based on rules 334 and one or more of the user identification data received in action 372 and the user profile data obtained in action 373.

Flowchart 470 continues with detecting one of a responsive user input and a non-response to the dialog initiated in action 474 (action 475). A responsive input to the dialog initiated in action 474 may be received from user 124 via conversational interface 122. In some implementations, the responsive input by user 124 may take the form of a mouse click, keyboard entry, touchscreen selection, or any other manual input. In addition, or alternatively, in some implementations, the responsive input from user 124 may be speech by user 124 responsive to the dialog initiated by conversational agent software code 120/220.

By contrast, a non-response by user 124 may be the absence of a manual input to conversational interface 122 or speech by user 124 within a predetermined time interval following action 474. Detection of the responsive user input from user 124 or the non-response by user 124 may be performed by conversational agent software code 120/220, executed by hardware processor 104, and using dialog module 248.

Flowchart 470 continues with updating the user profile data obtained in action 473 based on the responsive user input or the non-response by user 124, resulting in updated user profile data (action 476). Referring, for example, to conversation tree 360 in FIG. 3D, if user 124 responds to the dialog initiated in action 474 by playing Content A promoted in the dialog, as indicated by user action 364a, conversational agent database 246 may be updated to include consumption of Content A by user 124. As another example, where user 124 responds to the dialog initiated in action 474 with user action 366a expressing interest in Content A but requesting that it be saved for later, the user profile data for user 124 may be updated by increasing the interest level associating user 124 with Content A.

By contrast, if user 124 responds to the dialog initiated in action 474 by rejecting or otherwise expressing a lack of interest in Content A, as shown by user action 368a, the user profile data for user 124 may be updated by decreasing the interest level associating user 124 with Content A. Updating of the user profile data for user 124 may be performed by conversational agent software code 120/220, executed by hardware processor 104, and using dialog module 248 and conversational agent database 246. The updated user profile data may be stored in conversational agent database 246 and/or user profile database 111.

Flowchart 470 continues with identifying a second predetermined phrase for use in interacting with user 124 based on the updated user profile data resulting from action 476 (action 477). In addition, in some implementations, deep metadata stored in content metadata library 110 may be accessed and used in conjunction with the updated user profile data resulting from action 476 to identify the second predetermined phrase for use in interacting with user 124, as discussed above with respect to action 473. Identification of the second predetermined phrase for interacting with user 124 may be performed in an automated process by conversational agent software code 120/220, executed by hardware processor 104, and using dialog module 248. That is to say, hardware processor 104 executes conversational agent software code 120/220 to continue the dialog based on the updated user profile data.

In some implementations, for example, the second predetermined phrase identified by conversational agent software code 120/220 may be an affirmative recommendation of content to user 124 based on the content consumption history of user 124 included in the updated user profile data for user 124. For instance, where user 124 had been a consistent consumer of a particular TV series but has recently missed episodes, and where user 124 responds to a question issued in action 474 by expressing lack of continued interest in the TV series, the second predetermined phrase identified in action 477 may recommend alternative content based on a recommendation solicited and received from content recommendation engine 112 by conversational agent software code 120/220.

Although not included in the outline provided by flowchart 470, in some implementations, action 476 may be followed by, and action 477 may be preceded by, determining a dialog classification for continuing the dialog with user 124, and identifying multiple alternative predetermined phrases for use in interacting with user 124 based on that dialog classification. In some implementations, the dialog classification for continuing the dialog with user 124 may be the same dialog classification used to initiate the dialog. However, in some implementations, conversational agent software code 120/220 may switch between dialog classifications during the dialog with user 124 based on the responsive user input or non-response detected in action 475.

Flowchart 470 can conclude with continuing the dialog with user 124 based on the second predetermined phrase identified in action 477 (action 478). Continuation of the dialog with user 124 based on the second predetermined phrase identified in action 477 may be performed via conversational interface 122 by conversational agent software code 120/220, executed by hardware processor 104, and using dialog module 248. Continuation of the dialog with user 124 may include causing text of a dialog phrase corresponding to and based on the second predetermined phrase identified in action 477 to be rendered on display 128 of personal communication device 126.

Alternatively, continuation of the dialog with user 124 may include causing text of a dialog phrase corresponding to and based on the second predetermined phrase identified in action 477 to be converted from text to speech and be provided as a spoken word audio output to user 124, for example. As noted above, in some implementations, hardware processor 104 may execute conversational agent software code 120/220 to assume the persona of a TV, movie, or video game character based on the user profile data for user 124 obtained in action 472. In those implementations, the image of the character having the persona assumed by conversational agent software code 120/220 and rendered on display 128 of personal communication device 126 may appear to speak the dialog phrase corresponding to and based on the second predetermined phrase identified in action 477. It is noted that in some of those implementations, the second predetermined phrase may be identified in action 477 based at least in part on the persona assumed by conversational agent software code 120/220.

In some implementations, hardware processor 104 may further execute conversational agent software code 120/220 to improve its performance through machine learning. For example, conversational agent software code 120/220 may track inputs to conversational interface 122 by user 124 and record which content items are selected, which are rejected, and which are ignored, as discussed above by reference to FIG. 3D. That information can be used as feedback to conversational agent software code 120/220, to better learn how to effectively promote content to user 124. Moreover, in some implementations, conversational agent software code 120/220 may be executed by hardware processor 104 to trigger the creation of new predetermined phrases in response to one or more triggering events. Examples of such triggering events may include new content recommendations received from content recommendation engine 112, new deep metadata added to content metadata library 110, and/or new user data added to a user profile stored in user profile database 111.

Thus, the present application discloses systems and methods for promoting content using a conversational agent. By using one or more predetermined phrases or phrase templates to initiate and sustain a dialog with a user, the systems and methods disclosed in the present application provide a conversational agent capable of communicating effectively with the user. By accessing user profile data including a content consumption history of the user, the systems and methods disclosed herein enable the conversational agent to promote content likely to be of interest to the user. Moreover, in some implementations, by assuming the persona of a character from a movie, TV program, or video game enjoyed by the user, the conversational agent disclosed by the present application can establish a rapport with the user that is entertaining as well as engaging and informative to the user.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
a computing platform including a hardware processor and a system memory;
a conversational agent software code stored in the system memory;
the hardware processor configured to execute the conversational agent software code to:
receive a user identification data;
obtain a user profile data for a user associated with the user identification data, the user profile data including a video content consumption history of the user;
identify a first predetermined phrase for use in interacting with the user based on the video content consumption history in the user profile data;
initiate a dialog with the user based on the first predetermined phrase;
detect a responsive user input or a non-response to the dialog;
update the user profile data based on the responsive user input or the non-response, resulting in an updated user profile data;
identify a second predetermined phrase for use in interacting with the user based on the updated user profile data; and
continue the dialog with the user based on the second predetermined phrase.

2. The system of claim 1, wherein the first predetermined phrase includes at least one wildcard, and wherein the hardware processor is further configured to execute the conversational agent software code to populate the at least one wildcard based on at least one of the user identification data or the user profile data.

3. The system of claim 1, wherein at least one of the first predetermined phrase or the second predetermined phrase includes a content recommendation based on the video content consumption history of the user.

4. The system of claim 3, wherein a content recommended by the content recommendation is at least one of television (TV) content, movie content, or a video game.

5. The system of claim 1, wherein the hardware processor is further configured to execute the conversational agent software code to assume a persona of one of a TV character, a movie character, or a video game character based on the user profile data.

6. The system of claim 5, wherein at least one of the first predetermined phrase or the second predetermined phrase is identified based on the persona assumed by the conversational agent software code.

7. A method for use by a system including a computing platform having a hardware processor and a system memory storing a conversational agent software code, the method comprising:
receiving, by the conversational agent software code executed by the hardware processor, a user identification data;
obtaining, by the conversational agent software code executed by the hardware processor, a user profile data for a user associated with the user identification data, the user profile data including a video content consumption history of the user;
identifying, by the conversational agent software code executed by the hardware processor, a first predetermined phrase for use in interacting with the user based on the video content consumption history in the user profile data;
initiating by the conversational agent software code executed by the hardware processor, a dialog with the user based on the first predetermined phrase;
detecting, by the conversational agent software code executed by the hardware processor, a responsive user input a non-response to the dialog;
updating, by the conversational agent software code executed by the hardware processor, the user profile data based on the responsive user input or the non-response, resulting in an updated user profile data;
identifying, by the conversational agent software code executed by the hardware processor, a second predetermined phrase for use in interacting with the user based on the updated user profile data; and
continuing, by the conversational agent software code executed by the hardware processor, the dialog with the user based on the second predetermined phrase.

8. The method of claim 7, wherein the first predetermined phrase includes at least one wildcard, and wherein the method further comprises populating, by the conversational agent software code executed by the hardware processor, the at least one wildcard based on at least one of the user identification data or the user profile data.

9. The method of claim 7, wherein at least one of the first predetermined phrase or the second predetermined phrase includes a content recommendation based on the video content consumption history of the user.

10. The method of claim 9, wherein a content recommended by content recommendation is at least one of television (TV) content, movie content, or a video game.

11. The method of claim 7, further comprising assuming a persona of one of a TV character, a movie character; or a video game character, by the conversational agent software code executed by the hardware processor, based on the user profile data.

12. The method of claim 11, wherein at least one of the first predetermined phrase or the second predetermined phrase is identified based on the persona assumed by the conversational agent software code.

13. A system comprising:
- a computing platform including a hardware processor and a system memory;
- a conversational agent software code stored in the system memory;
- the hardware processor configured to execute the conversational agent software code to:
  - receive a user identification data;
  - obtain a user profile data for a user associated with the user identification data, the user profile data including a video content consumption history of the user and a dialog history of the user with the conversational agent;
  - determine a first dialog classification for communicating with the user;
  - identify a first plurality of predetermined phrases for use in interacting with the user based on the first dialog classification;
  - identify a first predetermined phrase for interacting with the user from among the first plurality of predetermined phrases based on the video content consumption history in the user profile data;
  - engage in a dialog with the user based on the first predetermined phrase;
  - detect a responsive user input or a non-response to the dialog;
  - update the user profile data based on the responsive user input or the non-response, resulting in an updated user profile data; and
  - continue the dialog with the user based on the updated user profile data.

14. The system of claim 13, wherein the first dialog classification is one of small talk, provision of services, or conversational agent initiated dialog.

15. The system of claim 13, wherein the first predetermined phrase includes at least one wildcard, and wherein the hardware processor is further configured to execute the conversational agent software code to populate the at least one wildcard based on at least one of the user identification data or the user profile data.

16. The system of claim 13, wherein the first predetermined phrase includes a content recommendation based on the video content consumption history of the user.

17. The system of claim 16, wherein a content recommended by the content recommendation is at least one of television (TV) content, movie content, or a video game.

18. The system of claim 13, wherein the hardware processor is further configured to execute the conversational agent software code to assume a persona of one of a TV character; a movie character, or a video game character based on the user profile data.

19. The system of claim 18, wherein the first predetermined phrase is identified based on the persona assumed by the conversational agent software code.

20. The system of claim 13, wherein the hardware processor is further configured to execute the conversational agent software code to:
- determine a second dialog classification for continuing the dialog with the user;
- identify a second plurality of predetermined phrases for use in continuing the dialog with the user based on the second dialog classification;
- identify a second predetermined phrase for continuing the dialog with the user from among the second plurality of predetermined phrases for use in continuing the dialog with the user based on the updated user profile data; and
- continue the dialog with the user based on the second predetermined phrase.

* * * * *